US009709700B2

(12) United States Patent
Stover et al.

(10) Patent No.: US 9,709,700 B2
(45) Date of Patent: Jul. 18, 2017

(54) OPTICAL BODIES INCLUDING ROUGH STRIPPABLE BOUNDARY LAYERS

(75) Inventors: Carl A. Stover, St. Paul, MN (US); Timothy J. Hebrink, Scandia, MN (US); Martin E. Denker, Vadnais Heights, MN (US); Jeffery N. Jackson, Woodbury, MN (US); Kristopher J. Derks, Woodbury, MN (US); Michael F. Weber, Shoreview, MN (US); Anna A. Kobilansky, Maplewood, MN (US); Joan M. Strobel, Maplewood, MN (US); Barry S. Rosell, Lake Elmo, MN (US); John P. Purcell, Madison, AL (US); Kevin M. Hamer, St. Paul, MN (US); Robert D. Taylor, Stacy, MN (US); William B. Black, Eagan, MN (US); Richard J. Thompson, Lino Lakes, MN (US); Gregory L. Bluem, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 626 days.

(21) Appl. No.: 11/100,191

(22) Filed: Apr. 6, 2005

(65) Prior Publication Data
US 2006/0228592 A1    Oct. 12, 2006

(51) Int. Cl.
*G02B 1/04*    (2006.01)
*B32B 27/32*    (2006.01)

(52) U.S. Cl.
CPC ............... *G02B 1/04* (2013.01); *B32B 27/32* (2013.01); *Y10T 428/24372* (2015.01);
(Continued)

(58) Field of Classification Search
CPC .. G02B 5/0816–5/0891; G02B 5/3041–5/305; G02B 1/04; C08L 23/12;
(Continued)

(56) References Cited

U.S. PATENT DOCUMENTS 540,768 A    6/1895   Western
3,124,639 A    3/1964   Kahn
(Continued)

FOREIGN PATENT DOCUMENTS

CN    1328553    10/1999
DE    010227039 A1    3/2003
(Continued)

OTHER PUBLICATIONS

Maier, C.; Calafut, T. (1998). Polypropylene—The Definitive User's Guide and Databook. William Andrew Publishing/Plastics Design Library, Additives—Chapter 3.*
(Continued)

*Primary Examiner* — Elizabeth A Robinson
(74) *Attorney, Agent, or Firm* — Daniel J. Iden (57) ABSTRACT

Optical bodies are disclosed that include a first optical film, a second optical film and at least one rough strippable boundary layer disposed between the first and second optical films. Also disclosed are optical bodies including a strippable boundary layer disposed between the first and second optical films and including a first polymer and a second polymer that is substantially immiscible in the first polymer. The present disclosure also provides methods of processing optical bodies that include stretching the optical bodies.

26 Claims, 3 Drawing Sheets

(52) U.S. Cl.
CPC ...... *Y10T 428/25* (2015.01); *Y10T 428/31507* (2015.04); *Y10T 428/31739* (2015.04); *Y10T 428/31786* (2015.04); *Y10T 428/31935* (2015.04); *Y10T 428/31938* (2015.04)

(58) Field of Classification Search
CPC .......... C08L 27/12–27/20; B32B 27/32; Y10T 428/25
See application file for complete search history.

(56) References Cited

U.S. PATENT DOCUMENTS

| | | | |
|---|---|---|---|
| 3,610,729 A | 10/1971 | Rogers | |
| 3,711,176 A | 1/1973 | Alfrey, Jr. et al. | |
| 3,860,036 A | 1/1975 | Newman, Jr. | |
| 4,264,664 A | 4/1981 | Kunz | |
| 4,367,312 A | 1/1983 | Bontinck | |
| 4,446,305 A | 5/1984 | Rogers et al. | |
| 4,520,189 A | 5/1985 | Rogers et al. | |
| 4,521,588 A | 6/1985 | Rogers et al. | |
| 4,525,413 A | 6/1985 | Rogers et al. | |
| 4,720,426 A | 1/1988 | Englert et al. | |
| 4,837,088 A | 6/1989 | Freedman | |
| 5,188,760 A | 2/1993 | Hikmet et al. | |
| 5,211,878 A | 5/1993 | Reiffenrath et al. | |
| 5,235,443 A | 8/1993 | Barnik et al. | |
| 5,262,894 A | 11/1993 | Wheatley et al. | |
| 5,269,995 A | 12/1993 | Ramanathan et al. | |
| 5,294,657 A | 3/1994 | Melendy et al. | |
| 5,316,703 A | 5/1994 | Schrenk | |
| 5,319,478 A | 6/1994 | Fünfschilling et al. | |
| 5,339,198 A | 8/1994 | Wheatly et al. | |
| 5,389,324 A | 2/1995 | Lewis et al. | |
| 5,448,404 A | 9/1995 | Schrenk et al. | |
| 5,486,935 A | 1/1996 | Kalmanash | |
| 5,486,949 A | 1/1996 | Schrenk et al. | |
| 5,520,760 A | 5/1996 | Freedman | |
| 5,552,927 A | 9/1996 | Wheatly et al. | |
| 5,607,764 A * | 3/1997 | Konno et al. | 428/327 |
| 5,612,820 A | 3/1997 | Schrenk et al. | |
| 5,629,055 A | 5/1997 | Revol et al. | |
| 5,685,128 A * | 11/1997 | Chum et al. | 53/441 |
| 5,686,979 A | 11/1997 | Weber et al. | |
| 5,699,188 A | 12/1997 | Gilbert et al. | |
| 5,721,603 A | 2/1998 | De Vaan et al. | |
| 5,744,534 A | 4/1998 | Ishiharada et al. | |
| 5,751,388 A | 5/1998 | Larson | |
| 5,767,935 A | 6/1998 | Ueda et al. | |
| 5,770,306 A | 6/1998 | Suzuki et al. | |
| 5,783,120 A | 7/1998 | Ouderkirk et al. | |
| 5,793,456 A | 8/1998 | Broer et al. | |
| 5,808,794 A | 9/1998 | Weber et al. | |
| 5,825,542 A | 10/1998 | Cobb, Jr. et al. | |
| 5,825,543 A | 10/1998 | Ouderkirk et al. | |
| 5,867,316 A | 2/1999 | Carlson et al. | |
| 5,882,774 A | 3/1999 | Jonza et al. | |
| 5,914,165 A | 6/1999 | Freedman | |
| 5,940,149 A | 8/1999 | Vanderwerf | |
| 5,962,114 A | 10/1999 | Jonza et al. | |
| 5,965,247 A | 10/1999 | Jonza et al. | |
| 6,006,913 A | 12/1999 | Ludemann et al. | |
| 6,141,149 A | 10/2000 | Carlson et al. | |
| 6,166,790 A | 12/2000 | Kameyama | |
| 6,171,422 B1 | 1/2001 | Cahill et al. | |
| 6,179,948 B1 | 1/2001 | Merrill et al. | |
| 6,185,039 B1 | 2/2001 | Allen et al. | |
| 6,210,785 B1 | 4/2001 | Weber et al. | |
| 6,245,844 B1 * | 6/2001 | Kurian et al. | 524/396 |
| 6,262,842 B1 | 7/2001 | Ouderkirk et al. | |
| 6,268,961 B1 | 7/2001 | Nevitt et al. | |
| 6,296,927 B1 | 10/2001 | Jonza et al. | |
| 6,307,676 B1 | 10/2001 | Merrill et al. | |
| 6,326,072 B1 | 12/2001 | Ojeda | |
| 6,329,046 B1 | 12/2001 | Merrill et al. | |
| 6,335,051 B1 | 1/2002 | Kausch et al. | |
| 6,352,761 B1 | 3/2002 | Hebrink et al. | |
| 6,352,762 B1 | 3/2002 | Shimizu et al. | |
| 6,368,699 B1 | 4/2002 | Gilbert et al. | |
| 6,391,896 B1 | 5/2002 | Van Hes et al. | |
| 6,396,631 B1 | 5/2002 | Ouderkirk | |
| 6,406,763 B1 | 6/2002 | Wolf et al. | |
| 6,407,862 B2 | 6/2002 | Moshrefzadeh | |
| 6,449,092 B1 | 9/2002 | Weber et al. | |
| 6,449,093 B2 | 9/2002 | Hebrink et al. | |
| 6,451,414 B1 | 9/2002 | Wheatley et al. | |
| 6,459,514 B2 | 10/2002 | Gilbert et al. | |
| 6,486,997 B1 | 11/2002 | Bruzzone et al. | |
| 6,498,683 B2 | 12/2002 | Condo et al. | |
| 6,543,143 B2 | 4/2003 | Moore et al. | |
| 6,590,034 B2 * | 7/2003 | Wanic et al. | 525/191 |
| 6,590,707 B1 | 7/2003 | Weber | |
| 6,654,085 B1 | 11/2003 | Koike | |
| 6,673,425 B1 | 1/2004 | Hebrink et al. | |
| 6,741,307 B2 | 5/2004 | Matsunaga et al. | |
| 6,760,156 B2 | 7/2004 | Tsuchimoto et al. | |
| 6,885,415 B2 | 4/2005 | Kuroda et al. | |
| 6,939,499 B2 | 9/2005 | Merrill | |
| 6,963,387 B2 | 11/2005 | Matsuno | |
| 7,070,849 B2 | 7/2006 | Mori et al. | |
| 2001/0013668 A1 | 8/2001 | Neavin et al. | |
| 2002/0034634 A1 | 3/2002 | Denehy | |
| 2002/0163719 A1 * | 11/2002 | Ma | G03B 21/60 359/443 |
| 2002/0190406 A1 | 12/2002 | Merrill | |
| 2003/0031845 A1 | 2/2003 | Umeya et al. | |
| 2003/0062114 A1 | 4/2003 | Yamaguchi | |
| 2003/0179460 A1 | 9/2003 | Hino | |
| 2003/0214718 A1 | 11/2003 | Kaminsky et al. | |
| 2004/0062513 A1 | 4/2004 | Sung et al. | |
| 2004/0099993 A1 | 5/2004 | Jackson et al. | |
| 2004/0219338 A1 | 11/2004 | Hebrink et al. | |
| 2004/0234724 A1 | 11/2004 | Kaminsky et al. | |
| 2005/0016670 A1 | 1/2005 | Kanbara et al. | |
| 2005/0040201 A1 | 2/2005 | Jackson et al. | |
| 2006/0093809 A1 | 5/2006 | Hebrink et al. | |
| 2006/0159888 A1 | 7/2006 | Hebrink et al. | |
| 2006/0227421 A1 | 10/2006 | Stover et al. | |
| 2006/0228092 A1 | 10/2006 | Hebrink et al. | |
| 2006/0228592 A1 | 10/2006 | Stover et al. | |
| 2008/0217799 A1 | 9/2008 | Stover et al. | |

FOREIGN PATENT DOCUMENTS

| | | |
|---|---|---|
| EP | 0 345 884 | 12/1989 |
| JP | 56123825 A * | 9/1981 |
| JP | 59-138452 | 8/1984 |
| JP | 60-040279 | 3/1985 |
| JP | 61-40178 | 9/1986 |
| JP | 62-231731 | 12/1987 |
| JP | 04-135729 | 5/1992 |
| JP | 04 140197 | 5/1992 |
| JP | 06-016851 | 1/1994 |
| JP | 06-312467 | 11/1994 |
| JP | 08-039649 | 2/1996 |
| JP | 10-253827 | 9/1998 |
| JP | 11-77916 | 3/1999 |
| JP | 2000301649 A | 10/2000 |
| JP | 2001030351 A | 2/2001 |
| JP | 2001-281454 | 10/2001 |
| JP | 2002-267844 | 9/2002 |
| JP | 2002-357704 | 12/2002 |
| JP | 2002355913 A | 12/2002 |
| JP | 2003-240951 | 8/2003 |
| JP | 2003-240953 | 8/2003 |
| JP | 05-157914 | 2/2004 |
| JP | 2004-34503 | 2/2004 |
| JP | 2004-122701 | 4/2004 |
| JP | 2008-518268 | 5/2006 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 95/27919 | 10/1995 |
| WO | WO 96/19347 | 6/1996 |

(56) References Cited

FOREIGN PATENT DOCUMENTS

| WO | WO 97/01440 | 1/1997 |
| --- | --- | --- |
| WO | WO 97/01774 | 1/1997 |
| WO | WO 99/36248 | 7/1999 |
| WO | WO 99/36257 | 7/1999 |
| WO | WO 99/36262 | 7/1999 |
| WO | WO 99/36729 | 7/1999 |
| WO | WO 99/36804 | 7/1999 |
| WO | WO 99/36809 | 7/1999 |
| WO | WO 99/36812 | 7/1999 |
| WO | WO 00/75560 | 12/2000 |
| WO | WO 01/38448 | 5/2001 |
| WO | WO 01/40708 | 6/2001 |
| WO | WO 01/79340 | 10/2001 |
| WO | WO 01/96104 | 12/2001 |
| WO | WO 02/16976 | 2/2002 |
| WO | WO 02/31539 | 4/2002 |
| WO | WO 02/32644 | 4/2002 |
| WO | WO 02/34514 | 5/2002 |
| WO | WO 02/093208 | 11/2002 |
| WO | WO 2006/049715 A | 5/2006 |
| WO | WO 2006/049949 | 5/2006 |
| WO | WO 2006/110400 | 10/2006 |

OTHER PUBLICATIONS

Van Horn et al., Conoscopic Measurement of Birefringence and Orientation in Biaxially Stretched Polymer Films and Sheets, Macromolecules 2003, 36, pp. 8513-8521.*
Cambridge Polymer Group, The Theory of Birefringence, 2004, CPGAN #014.*
Ajji et al., Biaxial orientation in LLDPE films: comparison of infrared spectroscopy, X-ray pole figures, and birefringence techniques, Polymer Engineering and Science, 2006, pp. 1182-1189.*
Schrenk et al., Nanolayer polymeric optical films, Tappi Journal, pp. 169-174, Jun. 1992.
Weber et al., "Giant Birefringent Optics in Multilayer Polymer Mirrors", Science, vol. 287, Mar. 31, 2000, pp. 2451-2456.
Patent Application—U.S. Appl. No. 10/427,422.
Patent Application—U.S. Appl. No. 10/977,211.
Search Report for PCT International Application No. US2006/012506, 3 pages.
Written Opinion for PCT International Application No. US2006/012506, 6 pages.
U.S. Appl. No. 60/668,700, entitled "Optical Bodies Including Rough Strippable Boundary Layers and Asymmetric Surface Structures", filed on Apr. 6, 2005.

* cited by examiner

OPTICAL BODIES INCLUDING ROUGH STRIPPABLE BOUNDARY LAYERS

FIELD OF THE INVENTION

The present disclosure relates to optical bodies and methods of processing optical bodies.

BACKGROUND

Optical films, including polymeric single layer optical films, polymeric multilayer optical films and polymeric optical films including disperse and continuous phases, are widely used for various purposes. Exemplary applications of polymeric optical films include display devices, such as liquid crystal displays (LCDs) placed in mobile telephones, personal data assistants, computers, televisions and other devices. Well known polymeric optical films include reflective polarizer films, such as Vikuiti™ Dual Brightness Enhancement Film (DBEF) and Vikuiti™ Diffuse Reflective Polarizer Film (DRPF), both available from 3M Company. Other well known polymeric optical films include reflectors, such as Vikuiti™ Enhanced Specular Reflector (ESR), also available from 3M Company.

Polymeric multilayer optical films used as polarizers or mirrors, usually include one or more first optical layers and one or more second optical layers. In addition to the first and second optical layers, some traditional multilayer films include one or more non-optical layers, such as one or more protective boundary layers located over or between packets of optical layers. The non-optical layers are usually integrated into the polymeric multilayer optical films so that at least a portion of the light to be transmitted, polarized, or reflected by the first and second optical layers also travels through these non-optical layers. Such non-optical layers can protect the optical layers from damage, aid in co-extrusion processing and/or enhance post-processing mechanical properties of the optical films. Thus, in such traditional optical films, it is usually important that the non-optical layers do not substantially affect the reflective properties of the optical films over the wavelength region of interest.

SUMMARY OF THE INVENTION

In one aspect, the present disclosure is directed to optical bodies including a first optical film, a second optical film and at least one rough strippable boundary layer disposed between the first and second optical films.

In another aspect, the present disclosure is directed to optical bodies including a first optical film, a second optical film and a strippable boundary layer disposed between the first and second optical films. In such exemplary embodiments, the strippable boundary layer includes a first polymer and a second polymer that is substantially immiscible in the first polymer.

The present disclosure is also directed to method of processing optical bodies. One exemplary method includes the steps of: providing an optical body comprising at least one rough strippable boundary layer between a first optical film and a second optical film; and stretching the optical body.

Another exemplary method of processing optical bodies according to the present disclosure includes the steps of: providing an optical body comprising at least one strippable boundary layer between a first optical film and a second optical film, the strippable boundary layer comprising a first polymer and a second polymer substantially immiscible in the first polymer; and stretching the optical body.

Yet another exemplary method of processing optical bodies according to the present disclosure includes providing an optical body comprising a first optical film, a second optical film and at least one rough strippable boundary layer disposed between the first and second optical films; conveying the optical body into a stretching region; and stretching the optical body to increase a transverse dimension of the optical body while conveying the opposing edges of the optical body along generally diverging paths in a machine direction. In this exemplary method, the generally diverging paths are configured and arranged to provide a machine direction draw ratio (MDDR), a normal direction draw ratio (NDDR) and a transverse direction draw ratio (TDDR) that approach the following relationship: MDDR=NDDR= $(TDDR)^{-1/2}$ during the stretching.

Yet another exemplary method of processing optical bodies according to the present disclosure includes providing an optical body comprising a first optical film, a second optical film and at least one rough strippable boundary layer disposed between the first and second optical films; conveying the optical body within a stretcher along a machine direction while holding opposing edge portions of the optical body; and stretching the optical body within the stretcher by moving the opposing edge portions along diverging non-linear paths. In this exemplary method, during the stretching of the optical body, the speed of the film along the machine direction decreases by a factor of approximately $\lambda^{1/2}$ where $\lambda$ is the transverse direction draw ratio.

BRIEF DESCRIPTION OF THE DRAWINGS

So that those of ordinary skill in the art to which the subject invention pertains will more readily understand how to make and use the subject invention, exemplary embodiments thereof are described in detail below with reference to the drawings, wherein.

DETAILED DESCRIPTION

As summarized above, the present disclosure provides an optical body that includes one or more strippable boundary layers and methods of making such optical bodies. According to the principles of the present disclosure, each strippable boundary layer is connected to at least one optical film. In some exemplary embodiments, one or more strippable boundary layers can be made rough and used to impart a surface texture into one or more optical films, for example, by co-extruding or orienting the optical film or films with a rough strippable boundary layer or by other suitable methods. The one or more rough strippable boundary layers can be constructed and used substantially in the same manner as rough strippable skin layers described in the commonly owned U.S. application Ser. No. 10/977,211 to Hebrink et al., entitled "Optical Bodies and Methods for Making Optical Bodies", filed on Oct. 29, 2004, the disclosure of which is hereby incorporated by reference herein to the extent it is not inconsistent with the present disclosure.

In typical embodiments of the present disclosure, the strippable boundary layers are connected to one or more optical films, such that they are capable of remaining adhered to the one or more optical films during initial processing, such as stretching, or in some exemplary embodiments, also during subsequent storage, handling, packaging, transporting and/or conversion, but can be stripped or removed by a user when desired. For example, the strippable boundary layers can be removed and the optical films separated shortly after stretching the optical body or shortly prior to installation of one or more of the constituent optical films into a display device. Preferably, the one or more strippable boundary layers and the one or more optical films are separated without applying excessive force, damaging the optical films, or contaminating the optical films with a substantial residue of particles from the strippable boundary layers. In other exemplary embodiments, optical bodies of the present disclosure may be installed into a display device with at least one strippable boundary layer still intact. This feature provides additional flexibility as to the form in which the optical bodies of the present disclosure may be used.

Figure 1:
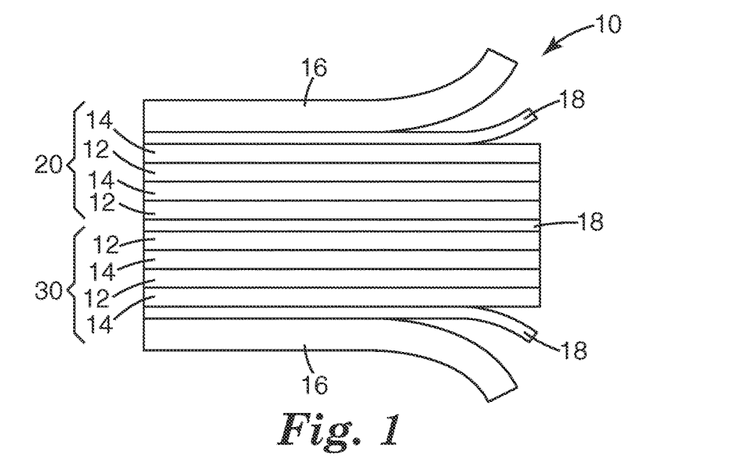
FIG. 1 is a schematic partial cross-sectional view of an optical body constructed in accordance with an exemplary embodiment of the present disclosure.
Figure 2:
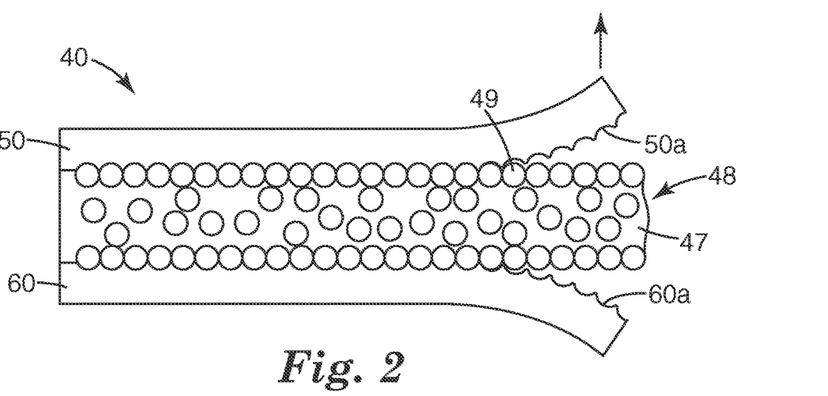
FIG. 2 is a schematic partial cross-sectional view of an optical body constructed in accordance with another exemplary embodiment of the present disclosure.
Figure 3:
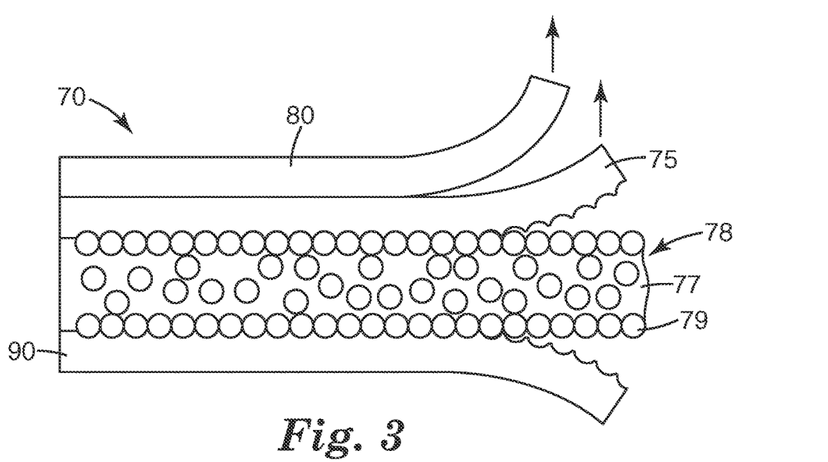
FIG. 3 is a schematic partial cross-sectional view of an optical body constructed in accordance with yet another embodiment of the present disclosure.

Reference is now made to FIGS. 1, 2 and 3 showing exemplary embodiments of the present disclosure in simplified schematic form. FIG. 1 is a partial schematic cross-sectional view showing an optical body 10, which includes a first optical film 20, a second optical film 30 and at least one strippable boundary layer 18 disposed between the first and second optical films. A first surface of the strippable boundary layer may be disposed adjacent to the optical film 20 and a second surface of the strippable boundary layer may be disposed adjacent to the optical film 30. In other exemplary embodiments, the strippable boundary layer may be disposed adjacent to one optical film and separated from another optical film by an additional layer, which may be an additional strippable layer or layers or the additional layer may be attached to the adjacent optical film. When desired, two strippable boundary layers may be provided between the optical films 20 and 30, for example, to provide different amounts of adhesion of a strippable boundary layer to the adjacent optical film 20 or 30. The optical body 10 may optionally further include one or more additional strippable boundary layers 18 disposed at outer surfaces of the optical films 20 and 30 and disposed adjacent to only one optical film, and one or more outer skin layers 16.

One example of materials that can be advantageously used in a construction shown in FIG. 1 is as follows: (1) first optical layers 12 made of 55 mol % of a diacid such as naphthalene dicarboxylate, 45% mol % of a diacid such as dimethyl terephthalate, 4 mol % hexane diol in the diol and 96 mol % ethlyene glycol; (2) second optical layers 14 made of polyethylene napthalate; (3) strippable boundary layers 18 made of polypropylene; and (3) outer skin layers 16 made of 75 mol % of a diacid such as naphthalene dicarboxylate, 25% mol % of a diacid such as dimethyl terephthalate, 4 mol % hexane diol in the diol and 96 mol % ethlyene glycol.

Exemplary optical bodies including more than two optical films may also further include additional strippable boundary layers (not shown) disposed between first and second optical films 20 and 30 and such additional optical films or between additional optical films (not shown). For example, the optical body 10 may further include a third optical film disposed next to the second optical film and a second strippable boundary layer disposed between the second optical film and the third optical film. Other exemplary embodiments may include more than three optical films, e.g., 6, 10 or more. The number of optical films used in an optical body constructed according to the present disclosure will depend on the equipment and materials used, as well as other relevant factors. Furthermore, the optical body 10 may include any other additional layers when suitable for a particular application. For example, one or both optical films 20 and 30 may further include one or more under-skin layers disposed between the optical film and the strippable boundary layer and forming a part of the optical film.

In some exemplary embodiments, one of or both optical films 20 and 30 may be or may include polymeric multilayer optical films, such as multilayer reflective polarizers. For example, one or both optical films may include one or more first optical layers 12 and one or more second optical layers 14. The first optical layers 12 may be birefringent polymer layers that are uniaxially or biaxially oriented. The second optical layers 14 may also be polymer layers that are birefringent and uniaxially or biaxially oriented. In other exemplary embodiments, the second optical layers 14 have an isotropic index of refraction that is different from at least one of the indices of refraction of the first optical layers 12 after orientation. One or both of the optical films 20 and 30 may be or may include polymeric optical films including a disperse phase and a continuous phase, such as a diffuse reflective polarizer. In yet other exemplary embodiments, one or more of the optical films 20 and 30 may be single-layer optical films.

FIG. 2 shows a partial schematic cross-sectional view of an optical body 40 constructed according to another exemplary embodiment of the present disclosure. The optical body 40 includes a first optical film 50, a second optical film 60 and a strippable boundary layer 48 disposed between the first and second optical films 50 and 60. In this exemplary embodiment, the strippable boundary layer 48 is a rough strippable boundary layer including a continuous phase 47 and a disperse phase 49. The disperse phase 49 can be formed by blending particles in the continuous phase 47 or by mixing in a material or materials that are immiscible in the continuous phase 47 at the appropriate stages of processing, which preferably then phase-separate and form a rough surface at the interface between the strippable boundary layer material and the optical film. For some applications, it may be desirable to form a boundary layer with one or more layers having continuous and disperse phases in which the interface between the two phases will be sufficiently weak to result in voiding when the film is oriented or otherwise processed. Such voids can contribute into creating the rough interface between the boundary layer and the adjacent optical film. The average dimensions and aspect ratio of the voids may be controlled through careful manipulation of processing parameters and stretch ratios, or through selective use of compatibilizers.

The continuous phase 47 and disperse phase 49 are shown in a generalized and simplified view in FIG. 2, while in practice the two phases can be less uniform and more irregular in appearance. For example, the schematic representation in FIG. 2 will be understood to cover the embodiment in which the strippable boundary layer includes a first polymer and a second polymer that is substantially immiscible in the first polymer but does not form clearly dispersed regions. In some exemplary embodiments, the strippable boundary layer 48 may contain multiple sub-phases of the disperse or/and the continuous phase. The strippable boundary layer 48 can be used to impart a surface texture including depressions 50a into a surface of the optical film 50 that is disposed adjacent to the strippable boundary layer 48, and a surface texture including depressions 60a into a surface of the optical film 60 that is disposed adjacent to the strippable boundary layer 48. The surface texture can be thus imparted during coextrusion, lamination and/or subsequent stretching of the optical films with the strippable boundary layers. The optical body 40 may further include any number of films or layers shown or described in reference to FIG. 1 and any other additional layers when suitable for a particular application.

FIG. 3 shows a partial schematic cross-sectional view of an optical body 70 constructed according to yet another exemplary embodiment of the present disclosure. The optical body 70 includes a first optical film 80, a second optical film 90, a strippable boundary layer 78 including a continuous phase 77 and a disperse phase 79 and a smooth strippable boundary layer 75, which can be formed integrally and removed with the rough strippable boundary layer 78. Alternatively, the smooth strippable boundary layer 75 can be formed and/or removed separately from the rough strippable boundary layer 78. In some exemplary embodiments, the smooth boundary layer 75 can include at least one of the same materials as the continuous phase 77.

The strippable boundary layer 48 can be used to impart a surface texture including depressions 50a into a surface of the optical film 50 that is disposed adjacent to the strippable boundary layer 48, and a surface texture including depressions 60a into a surface of the optical film 60 that is disposed adjacent to the strippable boundary layer 48. The surface texture can be thus imparted during the coextrusion, lamination and/or subsequent stretching of the optical films with the strippable boundary layers. When desired, two rough strippable layers may be provided between the optical films 80 and 90, for example, with different amounts of disperse phase to impart different amounts of roughness into different optical films. Furthermore, the optical body 70 may include any number of films or layers shown or described in reference to FIGS. 1 and 2 and any other additional layers when suitable for a particular application.

Strippable boundary layers included into the optical bodies constructed according to the present disclosure may have a first major surface that is removably attached to a first optical film and a second major surface that is removably attached to a second optical film. However, some exemplary optical bodies constructed according to the present disclosure may include at least one boundary layer that has a first major surface that is removably attached to a first optical film and a second major surface that is permanently attached to a second optical film via a material selection that provides an acceptable bond between the boundary layer and the second optical film so that the strippable boundary layer may be removed from the first optical film but not from the second optical film. In some embodiments, one of the optical films may serve as a skin layer added to satisfy processing requirements (coextrusion process or film handling and/or converting), which can be removed at some point of the process and discarded.

In another embodiment, a boundary layer may adhere to both the first and second optical films and, upon stripping, it may split to produce additional layers on the first and second optical films that are composed of boundary layer material. One way of obtaining these effects is to have a boundary layer that is a multilayer material composed of two or more materials, as explained above. In some of such exemplary embodiments that material selection will include material that have stronger or weaker adhesion to the adjacent optical film. The selection of these materials will be governed by the material composition of the adjacent optical film.

The optical films and layers depicted in FIGS. 1, 2 and 3 can be constructed to have different relative thicknesses than those illustrated.

Additional aspects of the invention will now be explained in greater detail.

Optical Films

Various optical films are suitable for use in the embodiments of the present disclosure. Optical films suitable for use in some embodiments of the present disclosure can include dielectric multilayer optical films (whether composed of all birefringent optical layers, some birefringent optical layers, or all isotropic optical layers), such as DBEF and ESR, and continuous/disperse phase optical films, such as DRPF, which can be characterized as polarizers or mirrors. Optical films suitable for use in embodiments of the present disclosure can be or can include a diffuse micro-voided reflective film, such as BaSO4-filled PET, or diffuse "white" reflective film such as $TiO_2$-filled PET. Alternatively, the optical film can be a single layer of a suitable optically clear isotropic or birefringent material, e.g., polycarbonate, and it may or may not include volume diffusers. Those of ordinary skill in the art will readily appreciate that the structures, methods, and techniques described herein can be adapted and applied to other types of suitable optical films. The optical films specifically mentioned herein are merely illustrative examples and are not meant to be an exhaustive list of optical films suitable for use with exemplary embodiments of the present disclosure.

More particularly, exemplary optical films that are suitable for use in embodiments of the present disclosure include multilayer reflective films such as those described in, for example, U.S. Pat. Nos. 5,882,774 and 6,352,761 and in PCT Publication Nos. WO95/17303; WO95/17691; WO95/17692; WO95/17699; WO96/19347; and WO99/36262, all of which are incorporated herein by reference. Both multilayer reflective polarizer optical films and continuous/disperse phase reflective polarizer optical films rely on index of refraction differences between at least two different materials (typically polymers) to selectively reflect light of at least one polarization orientation. Suitable diffuse reflective polarizers include the continuous/disperse phase optical films described in, for example, U.S. Pat. No. 5,825,543, incorporated herein by reference, as well as the diffusely reflecting optical films described in, for example, U.S. Pat. No. 5,867,316, incorporated herein by reference. Other materials and optical films including a disperse phase and a continuous phase, suitable for use in some embodiments of the present disclosure are also described in a commonly owned application entitled "Difffuse Reflective Polarizing Films With Orientable Polymer Blends," 3M Docket No. 60758US002, filed on even date herewith, the disclosure of which is hereby incorporated by reference herein to the extent it is not inconsistent with the present disclosure.

In some embodiments, one or more of the optical films is a multilayer stack of polymer layers with a Brewster angle (the angle at which reflectance of p-polarized light turns to zero) that is very large or nonexistent. As it is known by those of ordinary skill in the art, multilayer optical films can be made into a multilayer mirror or polarizer whose reflectivity for p-polarized light decreases slowly with angle of incidence, is independent of angle of incidence, or increases with angle of incidence away from the normal. Multilayer reflective optical films are used herein as an example to illustrate optical film structures and methods of making and using the optical films of the invention. As mentioned above, the structures, methods, and techniques described herein can be adapted and applied to other types of suitable optical films.

For example, a suitable multilayer optical film can be made by alternating (e.g., interleaving) uniaxially- or biaxially-oriented birefringent first optical layers with second optical layers. In some embodiments, the second optical layers have an isotropic index of refraction that is approximately equal to one of the in-plane indices of the oriented layer. The interface between the two different optical layers forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers.

A film having multiple layers can include layers with different optical thicknesses to increase the reflectivity of the film over a range of wavelengths. For example, a film can include pairs of layers that are individually tuned (for normally incident light, for example) to achieve optimal reflection of light having particular wavelengths. Generally, multilayer optical films suitable for use with certain embodiments of the invention have about 2 to 5000 optical layers, typically about 25 to 2000 optical layers, and often about 50 to 1500 optical layers or about 75 to 1000 optical layers. Some exemplary embodiments include about 825 optical layers or less, about 600 optical layers or less, about 275 layers or less, or even about 100 optical layers or less. The number of optical layers depends on the application. It should further be appreciated that, although only a single multilayer stack may be described, the multilayer optical film can be made from multiple stacks or different types of optical film that are subsequently combined to form the film.

A reflective polarizer can be made by combining a uniaxially oriented first optical layer with a second optical layer having an isotropic index of refraction that is approximately equal to one of the in-plane indices of the oriented layer. Alternatively, both optical layers are formed from birefringent polymers and are oriented in a draw process so that the indices of refraction in a single in-plane direction are approximately equal. The interface between the two optical layers forms a light reflection plane for one polarization of light. Light polarized in a plane parallel to the direction in which the indices of refraction of the two layers are approximately equal will be substantially transmitted. Light polarized in a plane parallel to the direction in which the two layers have different indices will be at least partially reflected.

For polarizers having second optical layers with isotropic indices of refraction or low in-plane birefringence (e.g., no more than about 0.07 at 632.8 nm), the in-plane indices ($n_x$ and $n_y$) of refraction of the second optical layers are approximately equal to one in-plane index (e.g., $n_y$) of the first optical layers. Thus, the in-plane birefringence of the first optical layers is an indicator of the reflectivity of the multilayer optical film. Typically, it is found that the higher the in-plane birefringence, the better the reflectivity of the multilayer optical film. Typically, the first optical layers have an in-plane birefringence ($n_x - n_y$) after orientation of about 0.04 or greater at 632.8 nm, about 0.1 or greater at 632.8 nm, about 0.15 or greater at 632.8 nm, preferably about 0.2 or greater at 632.8 nm, and more preferably about 0.3 or greater at 632.8 nm. If the out-of-plane indices ($n_z$) of refraction of the first and second optical layers are equal or nearly equal, the multilayer optical film also has better off-angle reflectivity. The same or similar design considerations apply to diffuse reflective polarizers including disperse and continuous polymeric phases.

A mirror can be made using at least one uniaxially birefringent material, in which two indices (typically along the x and y axes, or $n_x$ and $n_y$) are approximately equal, and different from the third index (typically along the z axis, or $n_z$). The x and y axes are defined as the in-plane axes, in that they represent the plane of a given layer within the multilayer film, and the respective indices $n_x$ and $n_y$ are referred to as the in-plane indices. One method of creating a uniaxially birefringent system is to biaxially orient (stretch along two axes) the multilayer polymeric film. If the adjoining layers have different stress-induced birefringence, biaxial orientation of the multilayer film results in differences between refractive indices of adjoining layers for planes parallel to both axes, resulting in the reflection of light of both planes of polarization.

Where the first optical layers are birefringent polymer layers that are uniaxially- or biaxially-oriented, the polymers of the first optical layers are typically selected to be capable of developing a large birefringence when stretched. Depending on the application, the birefringence may be developed between two orthogonal directions in the plane of the film, between one or more in-plane directions and the direction perpendicular to the film plane, or a combination of these. The first polymer should maintain birefringence after stretching, so that the desired optical properties are imparted to the finished film. The second optical layers can be polymer layers that are birefringent and uniaxially- or biaxially-oriented, or the second optical layers can have an isotropic index of refraction that is different from at least one of the indices of refraction of the first optical layers after orientation. In the latter case, the polymer of the second layers should develop little or no birefringence when stretched, or develops birefringence of the opposite sense (positive-negative or negative-positive), such that its film-plane refractive indices differ as much as possible from those of the polymer of the first optical layers in the finished film.

Materials suitable for making optical films for use in exemplary embodiments of the present disclosure include polymers such as, for example, polyesters, copolyesters and modified copolyesters. In this context, the term "polymer" will be understood to include homopolymers and copolymers, as well as polymers or copolymers that may be formed in a miscible blend, for example, by co-extrusion or by reaction, including, for example, transesterification. The terms "polymer" and "copolymer" include both random and block copolymers.

Exemplary polymers useful in the optical films of the present disclosure include polyethylene naphthalate (PEN). PEN is frequently chosen for use in the first optical layers. Other polymers suitable for use in the first optical layers include, for example, polybutylene 2,6-naphthalate (PBN), polyethylene terephthalate (PET), and copolymers thereof. Other materials suitable for use in optical films and, particularly, in the first optical layers, are described, for example, in U.S. Pat. Nos. 5,882,774, 6,352,761 and 6,498,683 and U.S. patent application Ser. Nos. 09/229,724, 09/232,332, 09/399,531, and 09/444,756, which are incorporated herein by reference. An exemplary coPEN suitable for use in the first optical layers is coPEN having carboxylate subunits derived from 90 mol % dimethyl naphthalene dicarboxylate and 10 mol % dimethyl terephthalate and glycol subunits derived from 100 mol % ethylene glycol subunits and an intrinsic viscosity (IV) of 0.48 dL/g. Another useful polymer is a PET having an intrinsic viscosity of 0.74 dL/g, available from Eastman Chemical Company (Kingsport, Tenn.).

Polymer or polymers suitable for use in the second optical layers should be chosen so that in the finished film, the refractive index, in at least one direction, differs significantly from the index of refraction of the first optical layers in the same direction. In addition, it will be understood that the choice of a second polymer is dependent not only on the intended application of the optical film in question, but also on the choice made for the first polymer, as well as processing conditions.

The second optical layers can be made from a variety of polymers having glass transition temperatures compatible with that of the first optical layers and having a refractive index similar to the isotropic refractive index of the first polymer. Examples of other polymers suitable for use in optical films and, particularly, in the second optical layers, other than the coPEN polymers mentioned above, include vinyl polymers and copolymers made from monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates.

Other exemplary suitable polymers, especially for use in the second optical layers, include homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units, or a blend of PMMA and poly(vinylidene fluoride) (PVDF) such as that available from Solvay Polymers, Inc., Houston, Tex. under the trade designation Solef 1008.

Yet other suitable polymers, especially for use in the second optical layers, include polyolefin copolymers such as poly(ethylene-co-octene) (PE-PO) available from Dow-Dupont Elastomers under the trade designation Engage 8200, poly(propylene-co-ethylene) (PPPE) available from Fina Oil and Chemical Co., Dallas, Tex., under the trade designation Z9470, and a copolymer of atatctic polypropylene (aPP) and isotatctic polypropylene (iPP). The optical films can also include, for example in the second optical layers, a functionalized polyolefin, such as linear low density polyethylene-g-maleic anhydride (LLDPE-g-MA) such as that available from E.I. duPont de Nemours & Co., Inc., Wilmington, Del., under the trade designation Bynel 4105.

Exemplary combinations of materials in the case of polarizers include PEN/co-PEN, polyethylene terephthalate (PET)/co-PEN, PEN/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co. Exemplary combinations of materials in the case of mirrors include PET/coPMMA, PEN/PMMA or PEN/coPMMA, PET/ECDEL, PEN/ECDEL, PEN/sPS, PEN/THV, PEN/co-PET, and PET/sPS, where "co-PET" refers to a copolymer or blend based upon terephthalic acid (as described above), ECDEL is a thermoplastic polyester commercially available from Eastman Chemical Co., and THV is a fluoropolymer commercially available from 3M. PMMA refers to polymethyl methacrylate and PETG refers to a copolymer of PET employing a second glycol (usually cyclohexanedimethanol). sPS refers to syndiotactic polystyrene. Non-polyester polymers may be used in creating polarizer films. For example, polyether imides can be used with polyesters, such as PEN and coPEN, to generate a multilayer reflective mirror. Other polyester/non-polyester combinations, such as polyethylene terephthalate and polyethylene (e.g., those available under the trade designation Engage 8200 from Dow Chemical Corp., Midland, Mich.), can be used.

Optical films included in the optical bodies constructed according to the present disclosure are typically thin, but in other exemplary embodiments they may be as thick as desired. Suitable films may have various thicknesses, but usually they include films with thicknesses of less than 15 mils (about 380 micrometers), typically less than 10 mils (about 250 micrometers), more typically less than 7 mils (about 180 micrometers), sometimes, less than 5 mils, less than 1.5 mils, or even less than 1 mil, e.g., 0.7 mils. During processing, a dimensionally stable layer may be included into the optical film by extrusion coating or coextrusion. Optical films of the present disclosure can also include optional other optical or non-optical layers, such as one or more non-strippable protective boundary layers between packets of optical layers. The non-optical layers may be of any appropriate material suitable for a particular application and can be or can include at least one of the materials used in the remainder of the optical film.

In some exemplary embodiments, an intermediate layer or an underskin layer can be integrally formed with the optical film or on one or more of its outer surfaces. One or more under-skin layers are typically formed by co-extrusion with the optical film, for example, to integrally form and bind the first and second optical layers. The underskin layer or layers can include immiscible blends with a continuous phase and a disperse phase which also can aid in creating surface roughness and haze. The disperse phase of the underskin layers can be polymeric or inorganic and, where a substantially clear optical film is desired, have about the same or similar refractive index as the continuous phase. In some exemplary embodiments of such clear optical films, the refractive indexes of the materials making up the disperse and continuous phases differ from each other by no more than about 0.02. An example of underskin layer with refractive index matched blend is a continuous phase comprising SAN and a disperse phase comprising PETG (copolyester commercially available from Eastman Chemical under the tradename Eastar 6763). An example of underskins with a refractive index mismatched blend is a continuous phase of Xylex 7200 and a disperse phase of polystyrene.

Strippable Boundary Layers

By selecting the materials comprised in the one or more strippable boundary layers, the interfacial adhesion between the strippable boundary layer(s) and the adjacent optical film can be controlled so that the strippable boundary layers are capable of remaining adhered to the optical film(s) for as long as desired for a particular application, but can also be cleanly stripped or removed from the optical film(s) before use without applying excessive force or, in the appropriate embodiments, without leaving a substantial residue of particles from the boundary layer on the adjacent optical film.

In some exemplary embodiments of the present disclosure, the materials comprised in the optical bodies with the strippable boundary layer(s) connected to the optical film(s) are substantially transparent or clear, so that the optical bodies can be inspected for defects using standard inspection equipment. Such exemplary clear optical bodies usually have strippable boundary layers in which the constituent materials have approximately the same or sufficiently similar refractive indexes. In some exemplary embodiments of such clear optical bodies, the refractive indexes of the materials making up the strippable boundary layers differ from each other by no more than about 0.02.

A boundary layer adhered to an adjacent surface of an optical film in exemplary optical bodies of the present disclosure, can be constructed so that the adhesion of the strippable boundary layer(s) to the optical film(s) is characterized by a peel force of about 2 g/in or more between a strippable boundary layer and the adjacent optical film. Other exemplary optical bodies constructed according to the present disclosure can be characterized by a peel force of about 4, 5, 10 or 15 g/in or more. In some exemplary embodiments, the optical bodies can be characterized by a peel force as high as about 100 g/in or even about 120 g/in. In other exemplary embodiments, the optical bodies can be characterized by a peel force of about 50, 35, 30 or 25 g/in or less. In some exemplary implementations the adhesion can be in the range from 2 g/in to 120 g/in, from 4 g/in to 50 g/in, from 5 g/in to 35 g/in, from 10 g/in to 25 g/in, or from 15 g/in to 25 g/in. In other exemplary embodiments, the adhesion can be within other suitable ranges. Peel forces over 120 g/in can be tolerated for some applications depending on the materials used.

In some exemplary embodiments that are characterized by higher values of peel forces between a strippable boundary layer and an adjacent optical film, various steps can be taken to aid in removal of the strippable boundary layers from one or more optical films. For example, an optical body of the present disclosure may be subjected to heat-setting, maintained at a particular temperature during the removal, subjected to tension, or/and allowed to age, which may permit any lubricants contained therein to reach a film or a layer surface.

The peel force that can be used to characterize exemplary embodiments of the present disclosure can be measured as follows. In particular, the present test method provides a procedure for measuring the peel force needed to remove a strippable boundary layer from an optical film (e.g., multi-layer film, polycarbonate, etc.). Test-strips are cut from the optical body with a strippable boundary layer adhered to an optical film. The strips are typically about 1" width, and more than about 6" in length. The strips may be preconditioned for environmental aging characteristics (e.g., hot, hot & humid, cold, thermal-shock).

Typically, the samples should dwell for more than about 24 hours prior to testing. The 1" strips are then applied to rigid plates, for example, using double-sided tape (such as Scotch™ double sided tape available from 3M), and the plate/test-strip assembly is fixed in place on the peel-tester platen. The leading edge of the strippable boundary layer is then separated from the optical film and clamped to a fixture connected to the peel-tester load-cell. The platen holding the plate/test-strip assembly is then carried away from the load-cell at constant speed of about 90 inches/minute, effectively peeling the strippable boundary layer from the substrate optical film at about a 180 degree angle. As the platen moves away from the clamp, the force required to peel the strippable boundary layer off the film is sensed by the load cell and recorded by a microprocessor. The force required for peel is then averaged over 5 seconds of steady-state travel (preferably ignoring the initial shock of starting the peel) and recorded.

It has been found that these and related goals can be accomplished by careful selection of the materials for making the strippable boundary layers and ensuring their compatibility with at least some of the materials used to make the optical film, especially the materials of the outer surfaces of the optical film or, in the appropriate exemplary embodiments, of the under-skin layers. In accordance with one implementation of the present disclosure, the strippable boundary layers may include a sufficient amount of material with low crystallinity or an amorphous material, in order to remain adhered to the optical film for a desired period of time. In some exemplary embodiments, two or more different materials with different adhesions can be used in the strippable boundary layers to achieve a desired amount of adhesion.

Materials suitable for use in the strippable boundary layer(s) include, for example, fluropolymers such as poly-vinylidene fluoride (PVDF), ethylene-tetrafluoroethylene fluoropolymers (ETFE), polytetrafluoroethylene (PTFE), copolymers of PMMA (or a coPMMA) and PVDF, or any of the THV or PFA materials available from 3M (St. Paul, Minn.). Processing aids such as Dynamar (available from 3M) or Glycolube (available fro Lonza Corporation in Fair Lawn N.J.) may enhance release characteristics of strippable boundary layers.

Materials suitable for use in the strippable boundary layer(s) generally include polyolefins, such as polypropylene and modified polypropylenes. Aliphatic polyolefins can be used. One suitable group of polypropylenes includes high density polypropylenes which exhibit particularly low adhesion to polyester and acrylic materials, and which are commonly used to make multilayer optical films. Polyethylene and their copolymers are also may be useful, including copolymers and propylene and ethylene. Other exemplary materials include polymethylpentene, cyclic olefin copolymers such as Topas available from Ticona Engineering Polymers (Florence, Ky.), copolymers of olefins with maleic anhydride, acrylic acid, or glycidyl methacrylate, or any of the Hytrel (thermoplastic polyester elastomer) or Bynel (modified ethylene vinyl acetate) materials available from DuPont Corporation (Wilmington, Del.).

Syndiotactic and atactic Vinyl aromatic polymers, which may be useful in some embodiments of the present disclosure, include poly(styrene), poly(alkyl styrene), poly(styrene halide), poly(alkyl styrene), poly(vinyl ester benzoate), and these hydrogenated polymers and mixtures, or copolymers containing these structural units. Examples of poly (alkyl styrenes) include: poly(methyl styrene), poly(ethyl styrene), poly(propyl styrene), poly(butyl styrene), poly (phenyl styrene), poly(vinyl naphthalene), poly(vinylstyrene), and poly(acenaphthalene) may be mentioned. As for the poly(styrene halides), examples include: poly(chlorostyrene), poly(bromostyrene), and poly(fluorostyrene). Examples of poly(alkoxy styrene) include: poly(methoxy styrene), and poly(ethoxy styrene). Among these examples, as particularly preferable styrene group polymers, are: polystyrene, poly(p-methyl styrene), poly(m-methyl styrene), poly(p-tertiary butyl styrene), poly(p-chlorostyrene), poly (m-chloro styrene), poly(p-fluoro styrene), and copolymers of styrene and p-methyl styrene may be mentioned. Furthermore, as comonomers of syndiotactic vinyl-aromatic group copolymers, besides monomers of above explained styrene group polymer, olefin monomers such as ethylene, propylene, butene, hexene, or octene; diene monomers such as butadiene, isoprene; polar vinyl monomers such as cyclic diene monomer, methyl methacrylate, maleic acid anhydride, or acrylonitrile may be mentioned.

Aliphatic copolyesters and aliphatic polyamides may also be useful materials for strippable boundary layers. As for polyester polymers and copolymers, the diacids can be chosen from terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chainester diols such as 3hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bior multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'dihydroxymethyl biphenyl and its isomers, and 1,3-bis(2-hydroxyethoxy)benzene and its isomers), and lower alkyl ethers or diethers of these diols, such as dimethyl or diethyl diols.

In the exemplary embodiment where at least one boundary layer is designed to permanently adhere to at least one adjacent optical film, the constituent materials must be provided with sufficient adhesion to that adjacent optical film. These materials will be chosen with regard to their adhesive properties to an optical film and, optionally, to another component of the boundary layer (in case of a multilayer boundary layer). Some materials that may be useful are those listed above and polymers of the same classes that have been modified to adhere to an optical film.

In some exemplary embodiments, the strippable boundary layer(s) may include low melting and low crystallinity polypropylenes and their copolymers; low melting and low crystallinity polyethylenes and their copolymers, low melting and low crystallinity polyesters and their copolymers, or any suitable combination thereof. Such low melting and low crystalinity polypropylenes and their copolymers consist of propylene homopolymers and copolymers of propylene and ethylene or alpha-olefin materials having between 4 to 10 carbon atoms. The term "copolymer" includes not only the copolymer, but also terpolymers and polymers of four or more component polymers. Suitable low melting and low crystallinity polypropylenes and their copolymers include, for example, syndiotactic polypropylene (such as, Finaplas 1571 from Total Petrochemicals, Inc.), which is a random copolymer with an extremely low ethylene content in the syndiotactic polypropylene backbone, and random copolymers of propylene (such as PP8650 or PP6671 from Atofina, which is now Total Petrochemicals, Inc.). The described copolymers of propylene and ethylene can also be extrusion blended with homopolymers of polypropylene to provide a higher melting point strippable boundary layer if needed.

Other suitable low melting and low crystallinity polyethylenes and polyethylene copolymers include, for example, linear low-density polyethylene and ethylene vinyl alcohol copolymers. Suitable polypropylenes include, for example, random copolymers of propylene and ethylene (for example, PP8650 from Total Petrochemicals, Inc.), or ethylene octene copolymers (for example, Affinity PT 1451 from Dow Chemical Company). In some embodiments of the present disclosure, the continuous phase includes an amorphous polyolefin, such as an amorphous polypropylene, amorphous polyethylene, an amorphous polyester, or any suitable combination thereof or with other materials. In some embodiments, the materials of the strippable boundary layers can include nucleating agents, such as sodium benzoate to control the rate of crystallization. Additionally, anti-static materials, anti-block materials, coloring agents such as pigments and dyes, polarizing dyes, migratory lubricants, stabilizers and other processing aids may be added. Additionally or alternatively, the rough strippable skin layers may include any other appropriate material. In some exemplary embodiments, migratory antistatic agents can be used in the strippable boundary layers to lower their adhesion to the optical films.

Rough Strippable Boundary Layers

In the exemplary embodiments of the present disclosure that include at least one rough strippable boundary layer, the boundary layer or layers may include any materials described above or any combination thereof. For example, the continuous phase or one of the first and second immiscible polymers may include any material mentioned in reference to the strippable boundary layers described above.

The degree of surface roughness of the rough strippable boundary layers can be adjusted by mixing or blending different materials, for example, polymeric materials, inorganic materials, or both into the disperse phase. In addition, the ratio of disperse phase to continuous phase can be adjusted to control the degree of surface roughness and adhesion and will depend on the particular materials used. Thus, in the exemplary embodiments including a rough strippable boundary layer, one, two or more polymers would function as the continuous phase, while one, two or more materials, which may or may not be polymeric, would provide a disperse phase with a suitable surface roughness for imparting a surface texture. The one or more polymers of the continuous phase can be selected to provide a desired adhesion to the material of the optical film. A material with relatively high crystallinity, such as high density polyethylene (HDPE) or polycaprolactone, can be blended into the rough strippable boundary layers in order to impart rough texture into the surface of an optical film that is adjacent to the rough strippable boundary layer and to affect adhesion. For example, HDPE could be blended into low crystallinity syndiotactic polypropylene (sPP) for improving surface roughness along with a low crystallinity poly(ethylene octene) (PE-PO) for improving adhesion.

Where the disperse phase is capable of crystallization, the roughness of the strippable skin layer or layers can be enhanced by crystallization of this phase at an appropriate extrusion processing temperature, degree of mixing, and quenching, as well as through addition of nucleation agents, such as aromatic carboxylic-acid salts (sodium benzoate); dibenzylidene sorbitol (DBS), such as Millad 3988 from Milliken & Company; and sorbitol acetals, such as Irgaclear clarifiers by Ciba Specialty Chemicals and NC-4 clarifier by Mitsui Toatsu Chemicals. Other nucleators include organo-phosphate salts and other inorganic materials, such as ADK-stab NA-11 and NA-21 phosphate esters from Asahi-Denka and Hyperform HPN-68, a norbornene carboxylic-acid salt from Milliken & Company. In some exemplary embodiments, the disperse phase includes particles, such as those including inorganic materials, that will protrude from the surface of the rough strippable boundary layers and impart surface structures into the optical film when the optical body is extruded, oriented, laminated or stretched.

The disperse phase of the rough strippable boundary layers can include particles or other rough features that are sufficiently large (for example, at least 0.1 micrometers average diameter) to be used to impart a surface texture into the outer surface of an adjacent layer of the optical film. At least a substantial portion of protrusions of the disperse phase should typically be larger than the wavelength of the light it is illuminated with but still small enough not to be resolved with an unaided eye. Such particles can include particles of inorganic materials, such as silica particles, talc particles, sodium benzoate, calcium carbonate, a combination thereof or any other suitable particles. Alternatively, the disperse phase can be formed from polymeric materials that are (or become) substantially immiscible in the continuous phase under the appropriate conditions.

The disperse phase can be formed from one or more materials, such as inorganic materials, polymers, or both that are different from at least one polymer of the continuous phase and immiscible therein, with the disperse polymer phases having typically a higher degree of crystallinity than the polymer or polymers of the continuous phase. It is preferred that the disperse phase is only mechanically miscible or immiscible with the continuous phase polymer or polymers. The disperse phase material or materials and the continuous phase material or materials can phase separate under appropriate processing conditions and form distinct phase inclusions within the continuous matrix, and particularly at the interface between the optical film and the rough strippable skin layer.

Exemplary polymers that are particularly suitable for use in the disperse phase include styrene acrylonitrile, modified polyethylene, polycarbonate and copolyester blend, C-caprolactone polymer, such as TONE™ P-787, available from Dow Chemical Company, random copolymer of propylene and ethylene, other polypropylene copolymers, poly (ethylene octene) copolymer, anti-static polymer, high density polyethylene, medium density polyethylene, linear low density polyethylene and polymethyl methacrylate. The disperse phase may include any other appropriate material, such as any suitable crystallizing polymer and it may include the same materials as one or more of the materials used in the optical film.

In some exemplary embodiments, the strippable boundary layer or layers may include at least 3 materials for the purposes of controlling strippable layer adhesion and providing a higher surface feature density. In some exemplary embodiments, more than 2 disperse sub-phases can result in rough features or protrusions of different sizes or compounded protrusions, such as "protrusion-on-protrusion" configurations, i.e., impart smaller concave surface features (depressions) between larger concave surface features (depressions), and, in some exemplary embodiments, smaller concave surface features (depressions) within larger concave surface features (depressions). Such constructions can be beneficial for creating hazier surfaces on optical films.

Materials used in such exemplary embodiments are available from different manufacturers as described: PEN (0.48 IV PEN from 3M Company), SAN (Tyril 880 from Dow Chemical), sPP (1571 available from Atofina, now Total Petrochemicals, Inc.), MDPE (Marflex TR130 available from Chevron-Philips), Admer (SE810 available from Mitsui Petrochemicals, Inc.), Xylex (Xylex 7200 available from GE Plastics Inc.), random propylene-ethylene copolymer (PP8650 available from Atofina, now Total Petrochemicals, Inc.), Pelestat 300 (Pelestat 300 available from Tomen America), Pelestat 6321 (Pelestat 6321 available from Tomen America), polycaprolactone (Tone 787), PMMA (VO44 available from Atofina, now Total Petrochemicals, Inc. Chemical), Polystyrene (Styron 685 available from Dow Chemical Company).

Material Compatibility and Methods

Optical bodies of the present disclosure can be made, for example, by coextrusion using a feedblock method. Exemplary manufacturing processes are described, for example, in U.S. patent Ser. Nos. 09/229,724, 08/402,041, 09/006,288 and U.S. Patent Application Publication No. 2001/0013668, U.S. Pat. No. 6,352,761, which are hereby incorporated herein by reference. Preferably, the materials of the optical bodies, and in some exemplary embodiments, of the first optical layers, the second optical layers, the optional non-optical layers, and of the strippable boundary layers are chosen to have similar Theological properties (e.g., melt viscosities) so that they can be co-extruded without flow instabilities. The effect of shear forces during coextrusion can be reduced by coextruding one or more outer skin layers when forming the optical bodies of the present disclosure. The materials of the outer skin layer or layers can be selected so that these layers may be removed from the optical body after or prior to any processing step.

The optical body exiting the feedblock manifold can then enter a shaping unit, such as a die. Alternatively, prior to entering the shaping unit, the polymeric stream may be split to form two or more streams that may then be recombined by stacking. This process is usually referred to as multiplication. Exemplary multipliers are described, for example, in U.S. Pat. Nos. 5,094,788 and 5,094,793, incorporated by reference herein. Strippable boundary layers may be added to the optical bodies of the present disclosure during coextrusion of the optical layers or optical film or after coextrusion of the optical layers or optical film, for example, prior to multiplication. In some exemplary embodiments, different strippable boundary layers may be added at different stages of the production process. After the optical body is discharged from the shaping unit, it may be cast onto a chill roll, casting wheel or casting drum.

Subsequently, the optical body may be drawn or stretched to produce the finished article. Depending on the type of optical films included into the optical body, the drawing or stretching may be accomplished in one, two or more steps. Where one or more of the optical films included into an optical body of the present disclosure is a reflective polarizer, the optical body may be drawn uniaxially or substantially uniaxially in the transverse direction (TD), while allowed to relax in the machine direction (MD) as well as the normal direction (ND). Suitable methods and apparatuses that can be used to draw such exemplary embodiments of the present disclosure are described in U.S. Application Publication Nos. 2002/0190406, 2002/0180107, 2004/0099992 and 2004/0099993, the disclosures of which are hereby incorporated by reference herein.

Drawing Optical Bodies in Uniaxial or Substantially Uniaxial Manner

Figure 4:
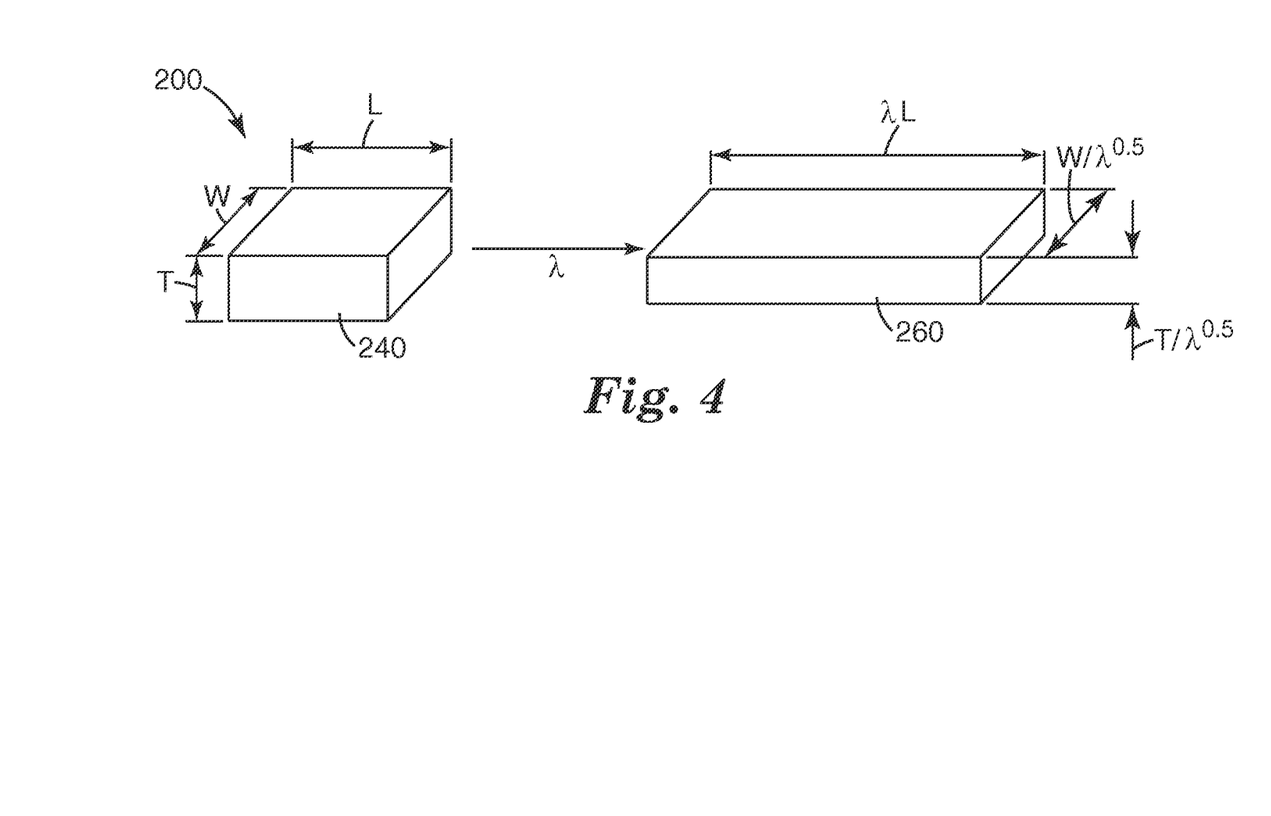
FIG. 4 illustrates uniaxially stretching an optical body.

The processes of the present disclosure may include stretching an optical body that can be described with reference to three mutually orthogonal axes corresponding to the machine direction (MD), the transverse direction (TD), and the normal direction (ND). These axes correspond to the width (W), length (L), and thickness (T) of the optical body 200 illustrated in FIG. 4. The stretching process stretches a region 200 of the optical body from an initial configuration 240 (corresponding to initial configuration 124 of FIG. 5) to a final configuration 260 (corresponding to final configuration 126 of FIG. 5). The machine direction is the general direction along which the film travels through a stretching device, for example, the apparatus illustrated in FIG. 5. The transverse direction (TD) is the second axis within the plane of the film and is orthogonal to the machine direction (MD). The normal direction (ND) is orthogonal to both MD and TD and corresponds generally to the thickness dimension of the polymer film.

Figure 5:
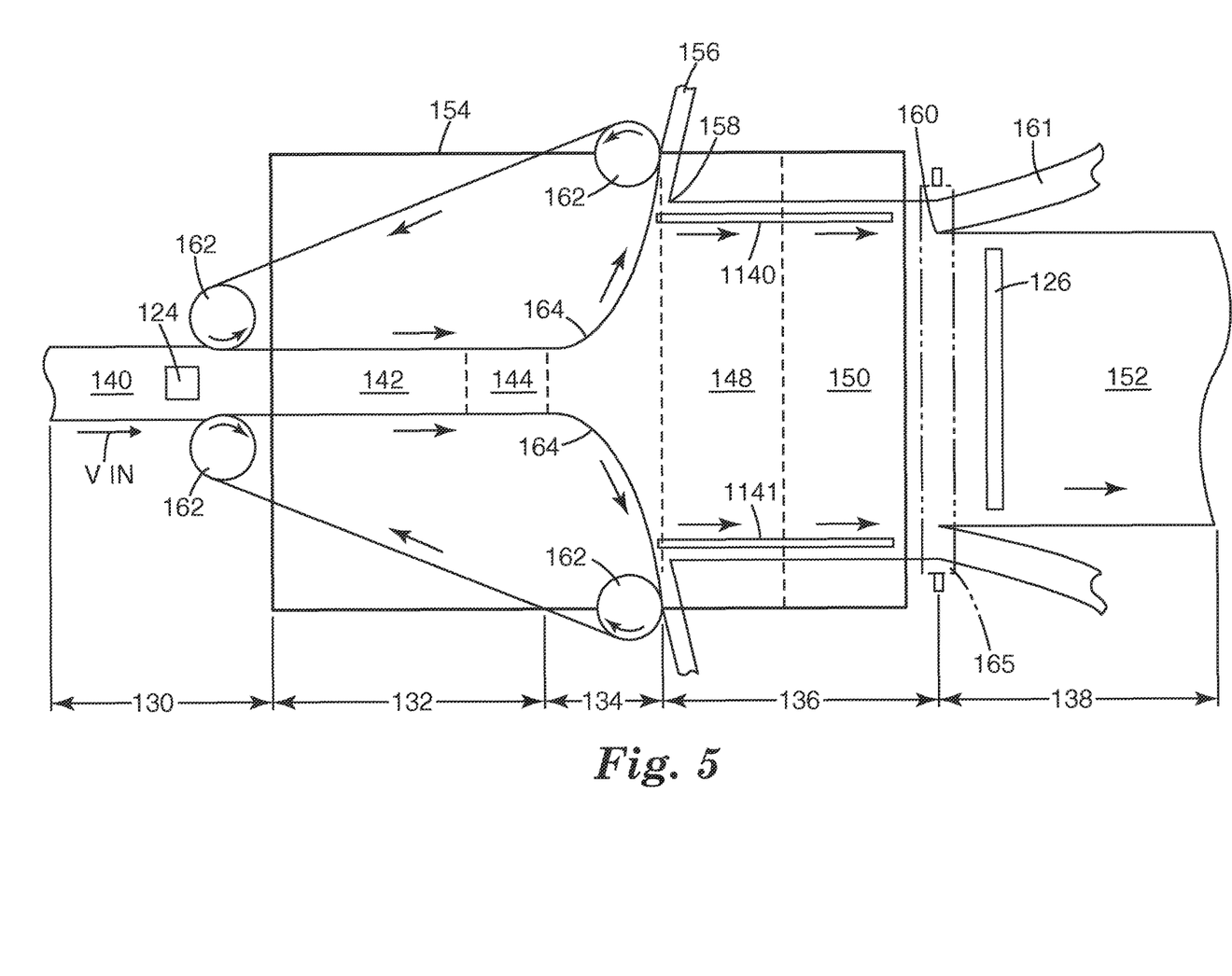
FIG. 5 is a schematic top view of an apparatus that may be used for processing optical bodies according to the present disclosure.

FIG. 5 illustrates one embodiment of a stretching apparatus and method of the present disclosure. The optical body can be provided to the stretching apparatus by any desirable method. For example, the optical body can be produced in a roll or other form and then provided to stretching apparatus. As another example, the stretching apparatus can be configured to receive the optical body from an extruder (if, for example, the optical body is generated by extrusion and ready for stretching after extrusion) or a coater (if, for example, the optical body is generated by coating or is ready for stretching after receiving one or more coated layers) or a laminator (if, for example the optical body is generated by lamination or is ready for stretching after receiving one or more laminated layers).

Generally, an optical body 140 is presented in region 130 to one or more gripping members that are configured and arranged to hold opposing edges of the optical body and convey the optical body along opposing tracks 164 defining predetermined paths. The gripping members (not shown) typically hold the optical body at or near its edges. The portions of the optical body held by the gripping members are often unsuitable for use after stretching so the position of the gripping members is typically selected to provide sufficient grip on the film to permit stretching while controlling the amount of waste material generated by the process.

Gripping members, such as clips, can be directed along the track by, for example, rollers 162 rotating a chain along the track with the gripping members coupled to the chain. The rollers are connected to a driver mechanism that controls the speed and direction of the film as it is conveyed through the stretching apparatus. Rollers can also be used to rotate and control the speed of belt-type gripping members.

Returning further to FIG. 5, the apparatus optionally includes a preconditioning region 132 that typically is enclosed by an oven 154 or other apparatus or arrangement to heat the optical body in preparation for stretching. The preconditioning region can include a preheating zone 142, a heat soak zone 144, or both.

The optical film may be stretched in the primary stretching region 134. Typically, within the primary stretching region 134 the optical body is heated or maintained in a heated environment above the glass transition of the polymer(s) of the optical body. Within the primary stretching region 134, the gripping members follow generally diverging tracks to stretch the optical body by a desired amount. The tracks in the primary stretching region and in other regions of the apparatus can be formed using a variety of structures and materials. Outside of the primary stretching region, the tracks are typically substantially linear. The opposing linear tracks can be parallel or can be arranged to be converging or diverging. Within the primary stretching region, the tracks are generally diverging.

In all regions of the stretching apparatus, the tracks can be formed using a series of linear or curvilinear segments that are optionally coupled together. As an alternative or in particular regions or groups of regions, the tracks can be formed as a single continuous construction. In at least some embodiments, the tracks in the primary stretching region are coupled to, but separable from, the tracks of the preceding regions. The tracks 1140, 1141 in the succeeding post-conditioning or removal regions are typically separated from the tracks of the primary stretching region, as illustrated in FIG. 5. In some embodiments, the positions of one or more, and preferably all, of the track segments are adjustable (e.g., pivotable about an axis) so that the overall shape of the tracks can be adjusted if desired. Continuous tracks can also be used through each of the regions.

Typically, the portions of the optical body that were held by the gripping members through the primary stretching region are removed. To maintain a substantially uniaxial draw throughout substantially all of the draw history (as shown in FIG. 5), at the end of the transverse stretch, the rapidly diverging edge portions 156 are preferably severed from the stretched optical body 148 at a slitting point 158. A cut can be made at 158 and flash or unusable portions 156 can be discarded.

Release of the selvages from a continuous gripping mechanism can be done continuously; however, release from discrete gripping mechanisms, such as tenter clips, should preferably be done so that all the material under any given clip is released at once. This discrete release mechanism may cause larger upsets in stress that may be felt by the drawing web upstream. In order to assist the action of the isolating takeaway device, it is preferred to use a continuous selvage separation mechanism in the device, e.g. the "hot" slitting of the selvage from the central portion of a heated, drawn film.

The slitting location is preferably located near enough to the "gripline", e.g. the isolating takeaway point of first effective contact by the gripping members of the take-away system, to minimize or reduce stress upsets upstream of that point. If the film is slit before the film is gripped by the take-away system, instable takeaway can result, for example, by film "snapback" along TD. The film is thus preferably slit at or downstream of the gripline. Slitting is a fracture process and, as such, typically has a small but natural variation in spatial location. Thus it may be preferred to slit slightly downstream of the gripline to prevent any temporal variations in slitting from occurring upstream of the gripline. If the film is slit substantially downstream from the gripline, the film between the takeaway and boundary trajectory will continue to stretch along TD. Since only this portion of the film is now drawing, it now draws at an amplified draw ratio relative to the boundary trajectory, creating further stress upsets that could propagate upstream, for example, undesirable levels of machine direction tension propagating upstream.

The slitting is preferably mobile and re-positionable so that it can vary with the changes in takeaway positions needed to accommodate variable final transverse draw direction ratio or adjustment of the position of the take-away system. An advantage of this type of slitting system is that the draw ratio can be adjusted while maintaining the draw profile simply by moving the take-away slitting point 158, preferably along MD. A variety of slitting techniques can be used including a heat razor, a hot wire, a laser, a focused beam of intense IR radiation or a focused jet of heated air.

The apparatus shown in FIG. 5 may optionally include a post-conditioning region 136. For example, the optical body may be set in zone 148 and quenched in zone 150. A takeaway system may be used to remove the optical body from the primary stretching region 134. In the illustrated embodiment, this takeaway system is independent of (i.e., isolated from or not directly connected to) the tracks upon which the film was conveyed through the primary stretching region. The takeaway system can use any film conveyance structures such as tracks 1140, 1141 with gripping members such as, for example, opposing sets of belts or tenter clips. In some embodiments, TD shrinkage control can be accomplished using tracks 1140, 1141 that are angled with respect to each other. For example, the tracks of the take-away system can be positioned to follow a slowly converging path (making an angle of no more than about 5°) through at least a portion of the post conditioning region to allow for TD shrinkage of the film with cooling. In other embodiments, the two opposing tracks can be diverging typically at an angle of no more than about 3° although wider angles can be used in some embodiments. This can be useful to increase the MD tension of the film in the primary stretching region to, for example, reduce property non-uniformity such as the variation of principal axes of refractive index across the film.

In some exemplary embodiments, the centerline of the take-away system is angled with respect to the centerline of the film as the film is conveyed through the tracks 164 of the primary stretching region. An angled take-away system, primary stretching zone, or both can be useful to provide films where the principal axis or axes of an property of the film, such as the refractive index axes or tear axis, is angled with respect to the film. In some embodiments, the angle that the take-away system makes with respect to the primary stretching zone is adjustable manually or mechanically using a computer-controlled driver or other control mechanism or both.

The exemplary process of FIG. 5 also includes a removal portion in region 138. Optionally a roller 165 may be used to advance the stretched film 152, but this component may be omitted. Another cut 160 may be made and unused portion 161 may be discarded. Film leaving the take-away system is typically wound on rolls for later use. Alternatively, direct converting may take place after take away.

The paths defined by the opposing tracks affect the stretching of the film in the MD, TD, and ND directions. The stretching (or drawing) transformation can be described as a set of draw ratios: the machine direction draw ratio (MDDR), the transverse direction draw ratio (TDDR), and the normal direction draw ratio (NDDR). When determined with respect to the film, the particular draw ratio is generally defined as the ratio of the current size (for example, length, width, or thickness) of the film in a desired direction (for example, TD, MD, or ND) and the initial size (for example, length, width, or thickness) of the film in that same direction. At any given point in the stretching process, TDDR corresponds to a ratio of the current separation distance of the boundary trajectories, L, and the initial separation distance of the boundary trajectories, $L_0$, at the start of the stretch. In other words, TDDR=$L/L_0$=$\lambda$. Some useful values of TDDR include about 1.5 to about 7 or more. Exemplary useful values of TDDR include about 2, 4, 5 and 6. Other exemplary useful values of TDDR lie in the ranges of about 4 to about 20, about 4 to about 12, about 4 to about 20, about 4 to about 8 and about 12 to about 20.

As explained in U.S. Application Publication Nos. 2002/0190406, 2002/0180107, 2004/0099992 and 2004/0099993, substantially uniaxial drawing conditions, with an increase in dimension in the transverse direction, result in TDDR, MDDR, and NDDR approaching $\lambda$, $(\lambda)^{-1/2}$, and $(\lambda)^{-1/2}$, respectively, assuming constant density of the material. A perfectly uniaxially oriented film is one in which MDDR=$(NDDR)^{-1/2}$=$(TDDR)^{-1/2}$ throughout the draw.

A useful measure of the extent of uniaxial character, U, can be defined as:

$$U = \frac{\frac{1}{MDDR} - 1}{TDDR^{1/2} - 1}$$

For a perfect uniaxial draw, U is one throughout the draw. When U is less than one, the drawing condition is considered "subuniaxial". When U is greater than one, the drawing condition is considered "super-uniaxial". States of U greater than unity represent various levels of over-relaxing. These over-relaxed states produce MD compression from the boundary edge. U can be corrected for changes in density to give $U_f$ according to the following formula:

$$U_f = \frac{\frac{1}{MDDR} - 1}{\left(\frac{TDDR}{\rho_f}\right)^{1/2} - 1}$$

In some exemplary embodiments, the film is drawn in plane (i.e., the boundary trajectories and tracks are coplanar) such as shown in FIG. 5, but non-coplanar stretching trajectories are also within the scope of the present disclosure. With in-plane boundary trajectories, the result for a perfect uniaxial orientation is a pair of mirror symmetric, in-plane, parabolic trajectories diverging away from the in-plane MD centerline.

Uniaxial draw may be maintained along the entire history of the draw as long as the speed of the central point reduces at every point along the central trace from its initial speed by a factor of exactly the square root of the reciprocal of the instantaneous TDDR measured between the corresponding opposing points on the opposing boundary trajectories.

Various factors can affect the ability to achieve uniaxial orientation including, for example, non-uniform thickness of the polymer film, non-uniform heating of the polymer film during stretching, and the application of additional tension (for example, machine direction tension) from, for example, down-web regions of the apparatus. However, in many instances it is not necessary to achieve perfect uniaxial orientation. In some exemplary implementations of the present disclosure, any value of U>0 may be useful. Instead, a minimum or threshold U value or an average U value that is maintained throughout the draw or during a particular portion of the draw can be defined. For example, in some exemplary embodiments, an acceptable minimum/threshold or average U value can be 0.2, 0.5, 0.7, 0.75, 0.8, 0.85, 0.9, or 0.95, as desired, or as needed for a particular application. When a specific value of U is chosen, the equations above provide a specific relationship between MDDR and TDDR, which, when coupled with other relevant considerations, specify a broader class of boundary trajectories that also include the parabolic trajectories for U approaching unity. Trajectories that exhibit values of U below unity for at least a final portion of the draw are referred to herein as sub-parabolic trajectories.

The classes of trajectories described above are illustrative and should not be construed as limiting. A host of trajectory classes are considered to lie within the scope of the present invention. The primary stretching region can contain two or more different zones with different stretching conditions. For example, one trajectory from a first class of trajectories can be selected for an initial stretching zone and another trajectory from the same first class of trajectories or from a different class of trajectories can be selected for each of the subsequent stretching zones.

Although the present disclosure encompasses all boundary trajectories comprising a minimum value of U>0, typical embodiments of the present disclosure include all substantially uniaxial boundary trajectories comprising a minimum value of U of about 0.2, about 0.5, preferably about 0.7, more preferably about 0.75, still more preferably about 0.8 and even more preferably about 0.85. The minimum U constraint may be applied over a final portion of the draw defined by a critical TDDR preferably of about 2.5, still more preferably about 2.0 and more preferably about 1.5. In some embodiments, the critical TDDR may be 4, 5 or more. Above a critical TDDR, certain materials, e.g. certain monolithic and multilayer films comprising orientable and birefringent polyesters, may begin to lose their elasticity or capability of snap back, e.g. because of the development of structure such as strain-induced crystallinity.

As an example of acceptable substantially uniaxial applications, the off-angle characteristics of reflective polarizers are strongly impacted by the difference in the MD and ND indices of refraction when TD is the principal mono-axial draw direction. An index difference in MD and ND of 0.08 is acceptable in some applications. A difference of 0.04 is acceptable in others. In more stringent applications, a difference of 0.02 or less is preferred. For example, the extent of uniaxial character of 0.85 is sufficient in many cases to provide an index of refraction difference between the MD and ND directions in polyester systems containing polyethylene naphthalate (PEN) or copolymers of PEN of 0.02 or less at 633 nm for mono-axially transverse drawn films. For some polyester systems, such as polyethylene terephthalate (PET), a lower U value of 0.80 or even 0.75 may be acceptable because of lower intrinsic differences in refractive indices in non-substantially uniaxially drawn films.

For sub-uniaxial draws, the final extent of truly uniaxial character can be used to estimate the level of refractive index matching between the y (MD) and z (ND) directions by the equation $$\Delta n_{yz} = \Delta n_{yz}(U=0) \times (1-U)$$

where $\Delta n_{yz}$ is the difference between the refractive index in the MD direction (i.e., y-direction) and the ND direction (i.e., z-direction) for a value U and $\Delta n_{yz}(U=0)$ is that refractive index difference in a film drawn identically except that MDDR is held at unity throughout the draw. This relationship has been found to be reasonably predictive for polyester systems (including PEN, PET, and copolymers of PEN or PET) used in a variety of optical films. In these polyester systems, $\Delta n_{yz}(U=0)$ is typically about one-half or more the difference $\Delta n_{xy}(U=0)$, which is the refractive difference between the two in-plane directions MD (y-axis) and TD (x-axis). Typical values for $\Delta n_{xy}(U=0)$ range up to about 0.26 at 633 nm. Typical values for $\Delta n_{yz}(U=0)$ range up to 0.15 at 633 nm. For example, a 90/10 coPEN, i.e. a copolyester comprising about 90% PEN-like repeat units and 10% PET-like repeat units, has a typical value at high extension of about 0.14 at 633 nm. Films comprising this 90/10 coPEN with values of U of 0.75, 0.88 and 0.97 as measured by actual film draw ratios with corresponding values of $\Delta n_{yz}$ of 0.02, 0.01 and 0.003 at 633 nm have been made according to the methods of the present invention.

A variety of other boundary trajectories are available when U is subuniaxial at the end of the stretching period. In particular, useful boundary trajectories include coplanar trajectories where TDDR is at least 5, U is at least 0.7 over a final portion of the stretch after achieving a TDDR of 2.5, and U is less than 1 at the end of the stretch. Other useful trajectories include coplanar and non-coplanar trajectories where TDDR is at least 7, U is at least 0.7 over a final portion of the stretch after achieving a TDDR of 2.5, and U is less than 1 at the end of the stretch. Useful trajectories also include coplanar and non-coplanar trajectories where TDDR is at least 6.5, U is at least 0.8 over a final portion of the stretch after achieving a TDDR of 2.5, and U is less than 1 at the end of the stretch. Useful trajectories include coplanar and non-coplanar trajectories where TDDR is at least 6, U is at least 0.9 over a final portion of the stretch after achieving a TDDR of 2.5, and U is less than 1 at the end of the stretch. Useful trajectories also include coplanar and non-coplanar trajectories where TDDR is at least 7 and U is at least 0.85 over a final portion of the stretch after achieving a TDDR of 2.5.

Generally, various methods may be used for forming and processing optical bodies of the present disclosure, which may include extrusion blending, coextrusion, film casting and quenching, lamination and orientation, such as uniaxial and biaxial (balanced or unbalanced) stretching. As stated above, the optical bodies can take on various configurations, and thus the methods vary depending upon the configuration and the desired properties of the final optical body.

Thus, the present disclosure provides optical bodies including strippable boundary layers and methods for producing such optical bodies that could significantly increase production capacity and decrease labor costs, because at least twice as much product can be stretched concurrently. Converting costs also can be reduced, because each converted piece will yield at least two parts of the film product. The resulting optical body can be left intact during shipment and handling until a customer is ready to use the films. This allows one or more surfaces of the optical film to be protected by the adjacent boundary layer.

Although the present invention has been described with reference to the exemplary embodiments specifically described herein, those of skill in the art will recognize that changes may be made in form and detail without departing from the spirit and scope of the present disclosure.

What is claimed is:

1. An optical body, comprising:
   a first optical film;
   a second optical film; and
   at least one rough strippable boundary layer disposed between the first and second optical films, wherein each of the first and second optical films comprises at least one of a multilayer reflective polarizer optical film and a multilayer mirror film, wherein the rough strippable boundary layer comprises a continuous phase and a disperse phase, wherein the rough strippable boundary layer comprises a homopolymer of polypropylene;

wherein a first major surface of the rough strippable boundary layer is adjacent to a first major surface of the first optical film along a first interface and an opposed second major surface of the rough strippable boundary layer is adjacent to a first major surface of the second optical film, and wherein the ratio of the continuous phase and the disperse phase in the rough strippable boundary layer defines a degree of surface roughness and adhesion of the rough strippable boundary layer to the first major surface of the first optical film along the first interface, wherein the degree of surface roughness and the adhesion of the rough strippable boundary layer to the first major surface of the first optical film along the first interface defined by the rough strippable is such that the rough strippable boundary layer is removable, via application of a peel force, from the first optical film along all of the first interface to expose the first major surface of the first optical film and to provide the first optical film separate from the rough strippable boundary layer.

2. The optical body of claim 1, wherein at least one rough strippable boundary layer further comprises a nucleating agent.

3. The optical body of claim 1, wherein the rough strippable boundary layer further comprises voids.

4. The optical body of claim 1, wherein at least one of the optical films comprises at least one underskin layer.

5. The optical body of claim 4, wherein the underskin layer comprises styrene acrylonitrile, polycarbonate, PET or cycloaliphatic polyester/polycarbonate.

6. The optical body of claim 4, wherein the underskin layer comprises a first material and a second material substantially immiscible in the first material, said second material being polymeric or inorganic.

7. The optical body of claim 1, wherein at least one rough strippable boundary layer further comprises a coloring agent.

8. The optical body of claim 1, said optical body being substantially transparent.

9. The optical body of claim 1, wherein the optical body comprises a birefringent material.

10. The optical body of claim 1, further comprising a first exterior strippable boundary layer on a second major surface of the first optical film, wherein the second major surface of the first optical film is opposed to the first major surface of the first optical film and comprises an outer surface of the first optical film.

11. The optical body of claim 10, further comprising a skin layer on the first exterior strippable boundary layer.

12. The optical body of claim 10, further comprising a second exterior strippable boundary layer on a second major surface of the second optical film, wherein the second major surface of the second optical film is opposed to the first major surface of the second optical film and comprises an outer surface of the second optical film.

13. The optical body of claim 12, further comprising a skin layer on the second exterior strippable boundary layer.

14. The optical body of claim 1, wherein the first optical film includes a first optical layer along the first interface with the rough strippable boundary layer, the first optical layer having a first composition, and wherein the continuous phase of the rough strippable boundary layer is selected based on the composition of the first optical film such that the rough strippable boundary layer is removable, via the application of the peel force, from the first optical layer along all of the first interface to expose the first major surface of the first optical film.

15. The optical body of claim 14, wherein the composition of the first optical layer includes naphthalene dicarboxylate and dimethyl terephthalate.

16. The optical body of claim 15, wherein the composition of the first optical layer includes 55 mol % naphthalene dicarboxylate and 45 mol % dimethyl terephthalate.

17. An optical body comprising:
a first optical film;
a second optical film; and
a strippable boundary layer disposed between the first and second optical films, the strippable boundary layer comprising a first polymer and a second polymer that is substantially immiscible in the first polymer, wherein each of the first and second optical films comprises at least one of a multilayer reflective polarizer optical film, and a multilayer mirror film, wherein the strippable boundary layer comprises a homopolymer of polypropylene, wherein a first major surface of the strippable boundary layer is adjacent to a first major surface of the first optical film along a first interface and an opposed second major surface of the strippable boundary layer is adjacent to a first major surface of the second optical film, and wherein the ratio of the first polymer and the second polymer in the strippable boundary layer defines a degree of surface roughness and adhesion of the strippable boundary layer to the first major surface of the first optical film along the first interface, wherein the degree of surface roughness and the adhesion of the strippable boundary layer to the first major surface of the first optical film along the first interface defined by the strippable is such that the strippable boundary layer is removable, via application of a peel force, from the first optical film along all of the first interface to expose the first major surface of the first optical film and to provide the first optical film separate from the strippable boundary layer.

18. The optical body of claim 17, wherein the first polymer has crystallinity that is lower than crystallinity of the second polymer.

19. The optical body of claim 17, wherein the strippable boundary layer further comprises a third polymer.

20. The optical body of claim 17, wherein the strippable boundary layer further comprises an inorganic material.

21. The optical body of claim 17, wherein the strippable boundary layer further comprises a coloring agent.

22. The optical body of claim 17, wherein the optical body comprises a birefringent material.

23. The optical body of claim 17, further comprising a second strippable boundary layer adjacent to the strippable boundary layer, wherein the second strippable boundary layer is between the strippable boundary layer and the first major surface of the second optical film, and wherein the adhesion of the second strippable boundary layer to the first major surface of the second optical film is different from the first adhesion of the strippable boundary layer to the first major surface of the first optical film.

24. The optical body of claim 17, wherein the first optical film includes a first optical layer along the first interface with the rough strippable boundary layer, the first optical layer having a first composition, and wherein the continuous phase of the rough strippable boundary layer is selected based on the composition of the first optical film such that the rough strippable boundary layer is removable, via the application of the peel force, from the first optical layer along all of the first interface to expose the first major surface of the first optical film.

25. The optical body of claim 24, wherein the composition of the first optical layer includes naphthalene dicarboxylate and dimethyl terephthalate.

26. The optical body of claim 25, wherein the composition of the first optical layer includes 55 mol % naphthalene dicarboxylate and 45 mol % dimethyl terephthalate.

* * * * *